United States Patent
Göransson et al.

(10) Patent No.: US 7,083,544 B2
(45) Date of Patent: Aug. 1, 2006

(54) METHOD AND APPARATUS FOR MONITORING A TRANSMISSION PART

(75) Inventors: Göran Göransson, Kävlinge (SE); Leif Olausson, Helsingborg (SE)

(73) Assignee: Emotron AB, Helsingborg (SE)

( * ) Notice: Subject to any disclaimer, the term of this patent is extended or adjusted under 35 U.S.C. 154(b) by 171 days.

(21) Appl. No.: 10/471,375

(22) PCT Filed: Mar. 8, 2002

(86) PCT No.: PCT/SE02/00409

§ 371 (c)(1),
(2), (4) Date: Apr. 21, 2004

(87) PCT Pub. No.: WO02/073152

PCT Pub. Date: Sep. 19, 2002

(65) Prior Publication Data

US 2004/0168844 A1    Sep. 2, 2004

(30) Foreign Application Priority Data

Mar. 9, 2001 (SE) .................................. 0100814

(51) Int. Cl.
*B60K 1/02* (2006.01)
*B60L 11/00* (2006.01)
*G01R 31/34* (2006.01)

(52) U.S. Cl. ............................ 477/3; 477/906; 701/22; 324/772

(58) Field of Classification Search ................. 74/335; 477/3, 7, 34, 906, 907; 701/22, 29, 31; 73/117, 73/117.2, 117.3, 862.08, 862.29; 324/772
See application file for complete search history.

(56) References Cited

U.S. PATENT DOCUMENTS

| | | | | |
|---|---|---|---|---|
| 3,795,131 A | * | 3/1974 | Wade et al. ................. | 73/1.28 |
| 5,483,841 A | * | 1/1996 | Casada .................. | 73/862.193 |
| 5,521,482 A | | 5/1996 | Lang et al. | |
| 5,523,701 A | | 6/1996 | Smith et al. | |
| 6,370,969 B1 | * | 4/2002 | Pearl et al. ............ | 73/862.391 |
| 6,490,511 B1 | * | 12/2002 | Raftari et al. ................. | 701/22 |
| 6,577,137 B1 | * | 6/2003 | Fisher ........................ | 324/500 |
| 2005/0255963 A1 | * | 11/2005 | Hsieh et al. ................... | 477/3 |

FOREIGN PATENT DOCUMENTS

EP    1098186    5/2001

* cited by examiner

*Primary Examiner*—Roger Pang
(74) *Attorney, Agent, or Firm*—Browdy and Niemark, PLLC

(57) ABSTRACT

A control device for electric motors and a method for monitoring the serviceability of a transmission part arranged for transmission of torque between an electric motor and a load during operation. The method comprises the steps of initiating at least one test sequence, and sending a signal indicating an error if said at least one test sequence indicates that the serviceability of the transmission part is not acceptable and if no further test sequences are to be performed. Additionally, said at least one test sequence includes the steps of setting a rotation speed of the electric motor at a test rotation speed, which differs from the rotation speed of the electric motor immediately prior to said setting, and measuring at the electric motor, within a period starting from the setting of the rotation speed of the motor and ending when the rotation speed of the electric motor has reached the test rotation speed.

12 Claims, 6 Drawing Sheets

METHOD AND APPARATUS FOR MONITORING A TRANSMISSION PART

TECHNICAL FIELD OF THE INVENTION

The present invention relates to a method and an apparatus for monitoring the serviceability of a transmission part arranged for transmission of torque between an electric motor and a load during operation.

BACKGROUND ART

Today, the serviceability of a transmission part is monitored by checking that the load is rotating or turning. Generally, this is monitored by means of a sensor and a trigger object. One of the sensor and the trigger object is mounted on the load while the other one is arranged on a stationary part in the surroundings of the load. The sensor detects the trigger object every time they pass each other, thus generating a signal that is proportional to the rotational or turning speed of the load. The sensors in such systems are usually magnetic sensors, optical sensors, mechanical sensors, etc.

A drawback of such monitoring systems is that a portion of the system has to be mounted on the load, thereby possibly affecting properties of the load. Other drawbacks of mounting a portion of the monitoring system on the load are that the portion may fall off, that the sensing/signalling properties of the portion may be affected by dirt, dust, or other obstacles, and that the sensor and trigger object have to be very carefully mounted in order to ensure acceptable function.

Another drawback of such monitoring systems is that service personnel is required to visit the site of the system even when the malfunction originates from disturbances or malfunctions in the monitoring system.

In SU 1 992 268 a belt tension control system for a circular saw drive is described. The belt tension control utilises the fact that increased motor speed reduces the stator current of the motor. Thus, when the belt tension is low, stator current falls sharply and releases a contact. This belt tension control system presents the drawback of requiring service personnel visiting the site of the system even if the detected fault only results from a slipping transmission belt.

In SU 1 666 413 there is described a belt-type conveyor control with breakdown prevention. The system excludes emergency modes resulting from slippage of driving drums driving a conveyor belt. In order to achieve this, the moment variation rate of an asynchronous motor is measured using current sensors. The maximum variation rate is then used to specify a non-sensitivity zone. Even if this system is more reliable than the previously mentioned, the system still results in a rather high percentage of false failure alarms. The high percentage of false failure alarms is particularly evident in systems in which the torque requirement of the load varies over time.

SUMMARY OF THE INVENTION

It is an object of the present invention to provide a monitoring system that presents a low percentage of false fault alarms.

More particularly, according to one aspect of the invention, a method for monitoring the serviceability of a transmission part arranged for transmission of torque between an electric motor and a load during operation comprises the steps of:

initiating at least one test sequence, and sending a signal indicating an error if said at least one test sequence indicates that the serviceability of the transmission part is not acceptable and if no further test sequences are to be performed, wherein said at least one test sequence includes the steps of:

setting a rotation speed of the electric motor at a test rotation speed, which differs from the rotation speed of the electric motor immediately prior to said setting, performing at least one measurement at the electric motor, within a period starting from the setting of the rotation speed of the motor and ending when the rotation speed of the electric motor has reached the test rotation speed.

According to another aspect of the invention there is provided a control device for electric motors. The control device comprises means for sensing the torque of an electric motor during operation, and is characterised in that it comprises:

means for performing at least one test sequence, and means for sending a signal indicating an error if said at least one test sequence indicates that the serviceability of the transmission part is not acceptable and if no further test sequences are to be performed, wherein said means for performing at least one test sequence includes:

means for setting a rotation speed of the electric motor at a test rotation speed, which differs from the rotation speed of the electric motor immediately prior to said setting, means for performing at least one measurement, within a period starting from the setting of the rotation speed of the motor and ending when the rotation speed of the electric motor has reached the test rotation speed.

An advantage of providing a test sequence in which the speed of the motor is changed and in which measuring is performed during the change of motor speed is that it makes it possible to present more reliable alarm signals and to minimise the number of false fault alarms. As a result, the method minimises the number of unnecessary service visits at the site of the system.

A further advantage of the method is that it makes it possible to present reliable alarm signals even if the character of the load is such that the required torque varies during normal operation.

Further, the measurement is performed on the electric motor, which results in the advantage of making the process of installing the system easier and in the advantage that the installation does not affect any properties of the load.

In a preferred embodiment the motor is accelerated from a low speed to the test motor speed. The step of performing at least one measurement is then performed under more demanding conditions than during normal operation and thus the chance that the process discovers real faults is increased.

In one preferred test sequence the rotation of the motor is halted before setting the rotation speed of the motor at a test rotation speed and the direction of test rotation speed is the opposite direction in respect of the rotation direction during normal operation. The advantage of this embodiment is that the test sequence is able to determine whether the transmission part is functioning normally or not even if an external force in the direction of normal operation does affect the load. If such external force is present the required torque from the motor is decreased by an amount corresponding to the external force. By driving the motor in reverse direction it is, however, possible to determine if the decreased torque is a result of failing torque transmission or an external force affecting the load, because the external force corresponds to an increase in torque requirement when the motor is driven in the reverse direction.

In a preferred embodiment the performing of at least one measurement includes logging the torque of the electric motor during the measurement period. The advantage of this feature is that it presents a simple way to make measurements on the motor in order to determine the status of the transmission part. Further, by logging the torque the effect of momentary irregularities in the torque is minimised. In a preferred embodiment the torque is measured by measuring the current in at least one winding of the motor and by performing calculations based on said current.

According to another preferred embodiment the process comprises a test sequence in which the test rotation speed of the step of setting the rotation speed is lower than the rotation speed immediately prior to said setting. The advantage of this test sequence is that it performs a test during a very short period of time and that it does not affect the normal operation of the load to any great extent. Still the test sequence manages to make it possible to perform measurements under quite demanding conditions.

According to yet another embodiment the step of performing at least one measurement includes registering the time that passes from the setting of the test rotation speed till the rotation speed of the motor equals the test rotation speed. The advantages of this embodiment are that it is simple and inexpensive to implement and that it results in an indication of the angular momentum of the load the motor is driving. Thus, if the process has knowledge of the angular momentum of the load, or the time it should take to accelerate the load in a predetermined interval, the process is able to find out if the transmission part is working properly.

When the step of performing at least one measurement indicates that the serviceability of the transmission part is not acceptable and if no further test steps are to be performed, the motor is preferably stopped and someone has to restart it. This means that the motor does not continue to drive a system when the transmission part is not working properly, thus avoiding damage resulting from such a state. To ensure that the risk of false fault alarms is minimal the process performs a series of test sequences. This series of test sequences preferably includes sequences based on any combination of the above mentioned steps of setting and performing at least one measurement. This approach makes it possible to exclude many different types of possible errors.

According to yet another embodiment the torque of the motor is monitored during normal operation and if the monitored torque indicates that something could be wrong then at least one test sequence is started. This makes it possible to quickly halt the motor if something is wrong. Thus minimising the time the motor is running in a system that does not work properly.

According to one embodiment of the invention the load is a heat exchanger rotor. A system according to the invention is particularly useful in such an application because of the varying character of such a load. Other characteristics of the heat exchanger is that the angular momentum of an ordinary heat exchanger rotor is large in relation to the torque required to rotate the rotor during normal operation, driving the heat exchanger in the direction of normal operation require less torque than driving it in the reverse direction, and the size and the angular momentum of the rotor results in the rotor being difficult to balance.

The further scope of applicability of the present invention will be apparent from the detailed description below. However, it should be understood that the detailed description and specific examples, while indicating preferred embodiments of the invention, are given by way of illustration only, since various changes and modifications within the spirit and scope of the invention will be apparent to those skilled in the art from this detailed description.

It should be emphasised that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The invention will now be described in more detail with reference to the accompanying drawings, in which.

DETAILED DESCRIPTION OF PREFERRED EMBODIMENTS OF THE INVENTION

Figure 1:
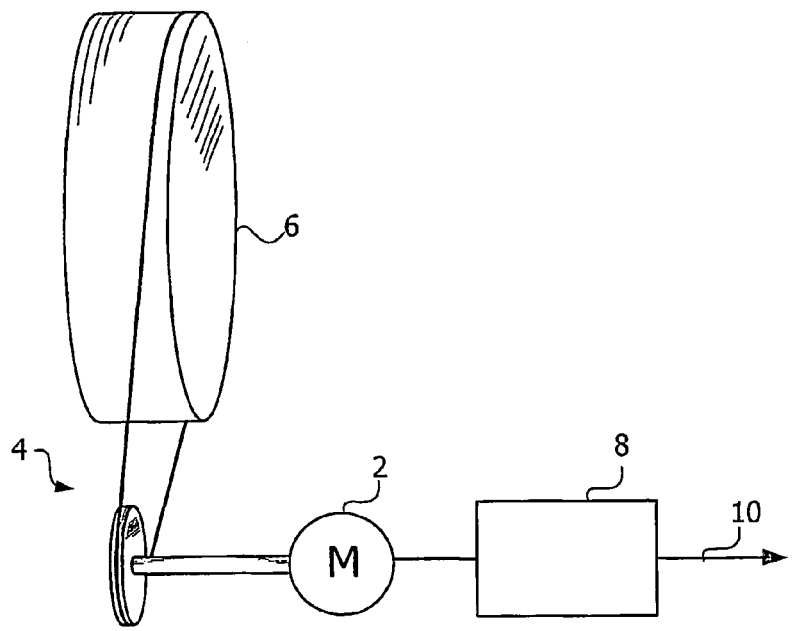
FIG. 1 is a schematic view of a possible environment where the invention could be used.

Referring to FIG. 1, the environment of the invention typically includes an electric motor 2, a transmission part 4, a load 6, and a control device for electric motors 8.

The electric motor 2 could be of any known type, e.g. asynchronous motor, synchronous motor, direct current motor, switched reluctance motor, permanent magnet motor, etc.

The transmission part 4 is the mechanical arrangement provided between the electric motor 2 and the load 6 in order to transmit the torque from the motor to the load. The transmission part could be any kind of transmission belt, e.g. flat transmission belt, V-belt, hexagonal transmission belt, synchronous transmission belt, etc, and it could also be a driving chain, toothed coupling, direct connection between the end of the shaft of the motor and the end of the shaft or the centre of rotation of the load, etc. In some applications a rubber wheel mounted on the motor axle is driving the load by making contact between the periphery of the rubber wheel and a cylinder of the load.

In the preferred embodiment the load 6 is a heat exchanger rotor arranged in a rotary heat exchanger, which is mainly used in industrial and office buildings to recover energy from the exhaust air. However, the load 6 could be part of a fan, a pump, a compressor, a driving drum of a conveyer belt system, an escalator, a centrifuge, an agitator system, a sawing machine, a planing machine, stone crusher, and other systems comprising a rotating load.

The control device for electric motors 8 is either a known control device, such as a frequency inverter, in which the invention has been implemented, or a device arranged solely for the purpose of implementing the invention. In a preferred embodiment said control device 8 provides an output signal 10 for indicating that an error has occurred and service is required.

Figure 2:
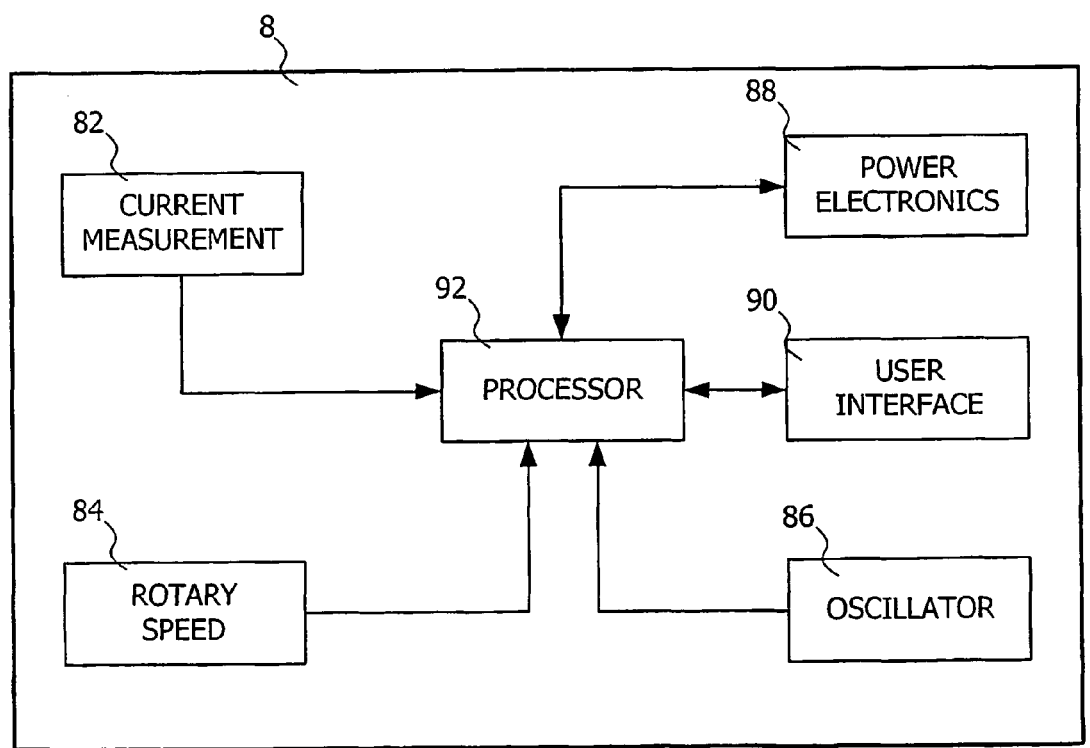
FIG. 2 is a schematic view of a preferred embodiment of the control device for electric motors in FIG. 1.

In FIG. 2 a preferred embodiment of the control device 8 is shown schematically. The control device 8 comprises a current measurement circuit 82, a rotary speed determining circuit 84, an oscillator 86, power electronics 88, a user interface 90, and a processor 92.

The current measurement circuit 82 measures the current of a motor winding. The constructions of different current measurement circuits are well known to a person skilled in the art. The value of the current is inputted to the processor 92 for calculating the present torque of the motor. For example, when the control device 8 is connected to a switched reluctance motor the calculation of the torque is based on the current, the present angle of the motor 2, and a model of the behaviour of the motor 2.

The rotary speed determining circuit 84 preferably receives a signal from a rotary sensor (not shown) arranged in the motor 2. Such a sensor could, for example, provide a specific number of pulses during one revolution of the rotor of the motor 2. Then the processor is able to determine the rotary speed of the motor by identifying the number of pulses received during a certain period of time.

The oscillator 86 provides the processor 92 with a time signal that is used in, for example, calculations.

The power electronics 88 is arranged to control the motor based on signals/instructions received from the processor 88. How to design the power electronics is well known to a person skilled in the art of controlling motors.

The user interface 90 is arranged to provide an operator with information about the controlled process, to make it possible for an operator to exert an influence on said process, and to provide alarm/service signals to remote systems. The user interface 90 could, for example, comprise a display, buttons, and interfaces for remote connections.

The processor 92 is programmed to control the motor 2, to perform various calculations, and to implement the process described below. In order to control the motor, perform calculations, and control the process described below, the processor is arranged to receive input signals from sensors, circuits and other devices. Input signals are at least received from the current measurement circuit 82, the rotary speed circuit 84, the oscillator 86, and the power electronics 88. In order to control the motor 2 the processor outputs control signals to the power electronics, and in order to communicate with an operator or remote systems the processor outputs signals to and receives signals from the user interface 90.

Figure 3:
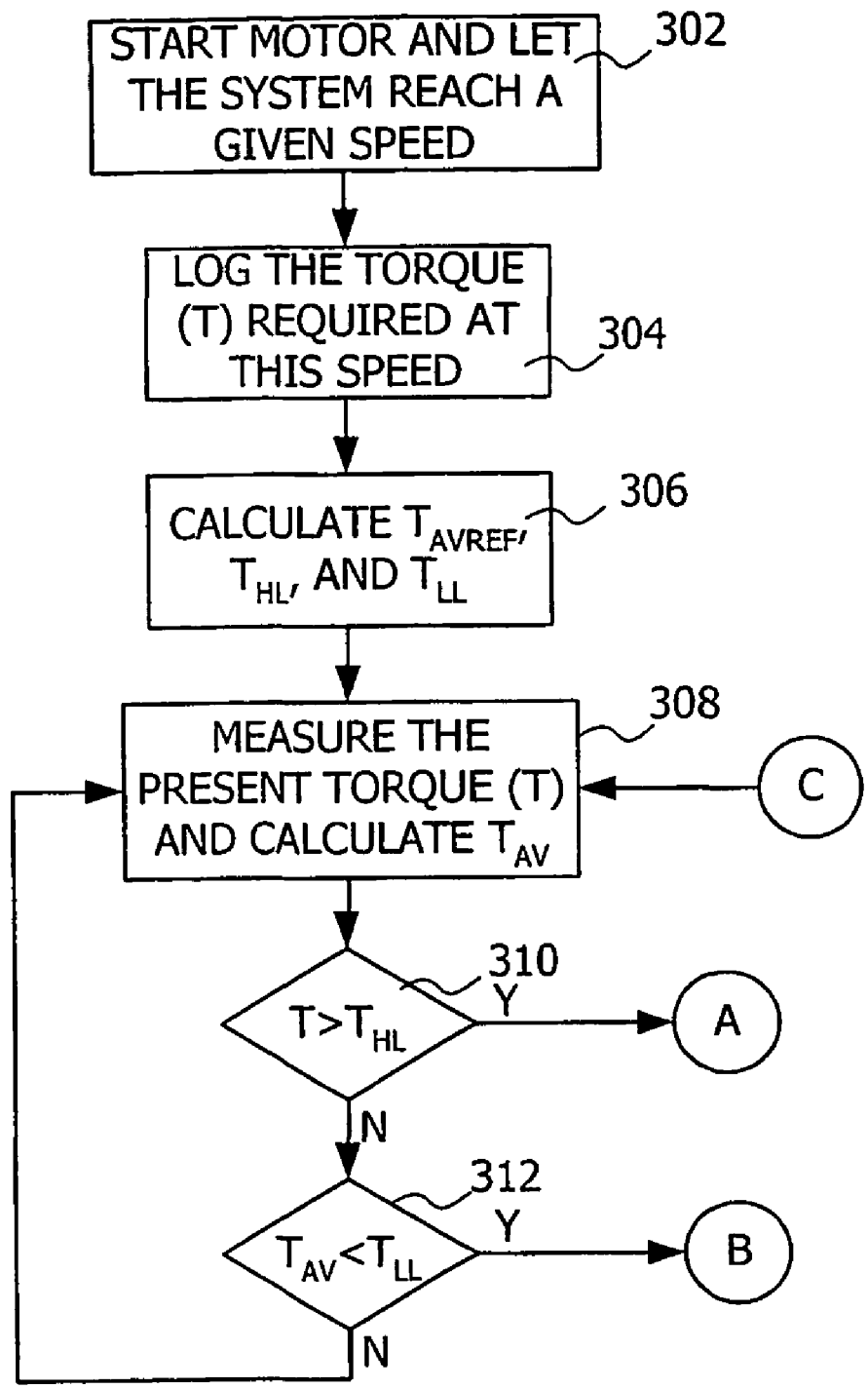
FIG. 3 shows a flowchart of a main process of a preferred embodiment.
Figure 4:
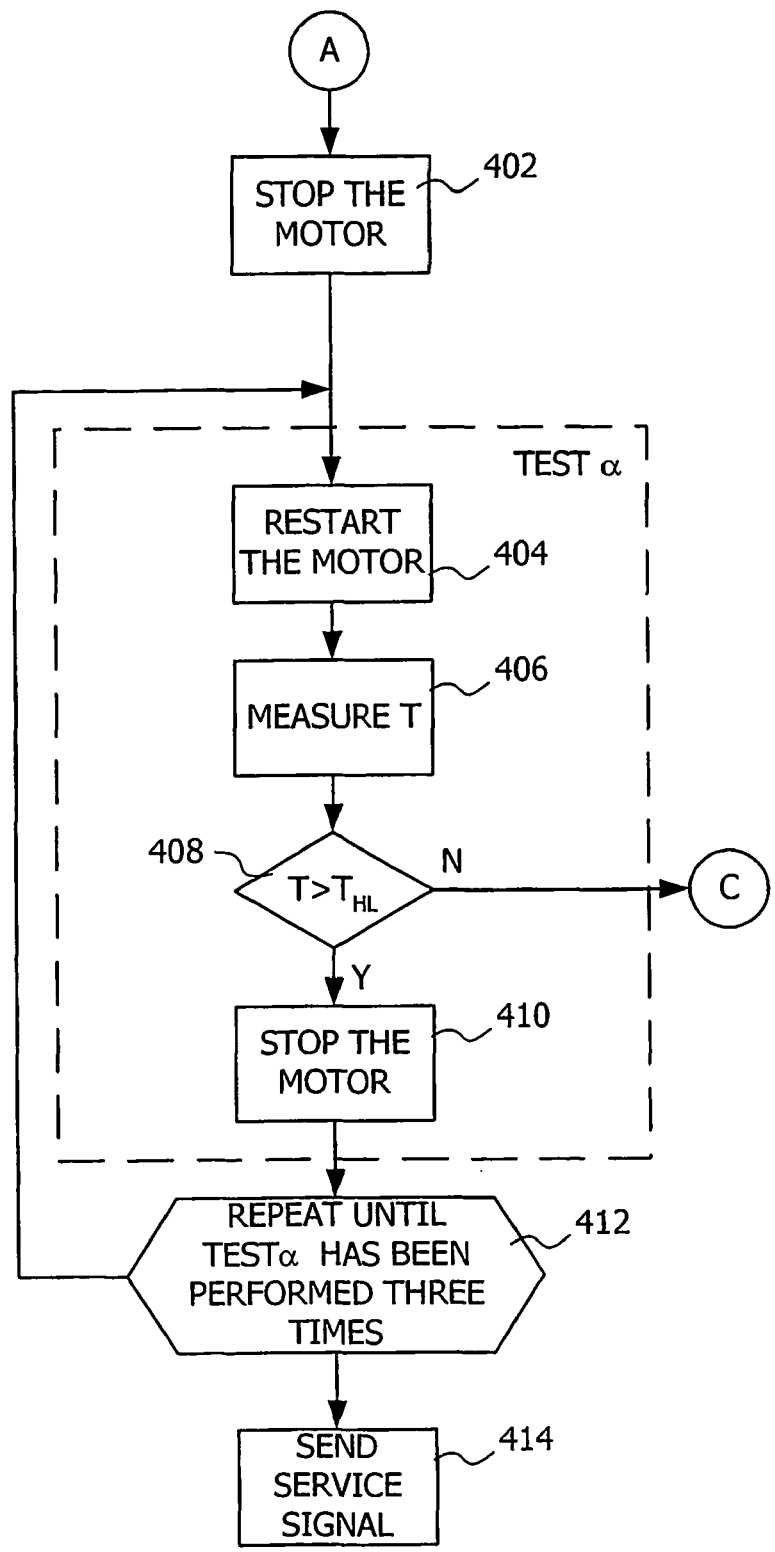
FIG. 4 shows a flowchart of a test sequence for testing a high torque indication, which test sequence is accessed from the main process of FIG. 3.
Figure 5:
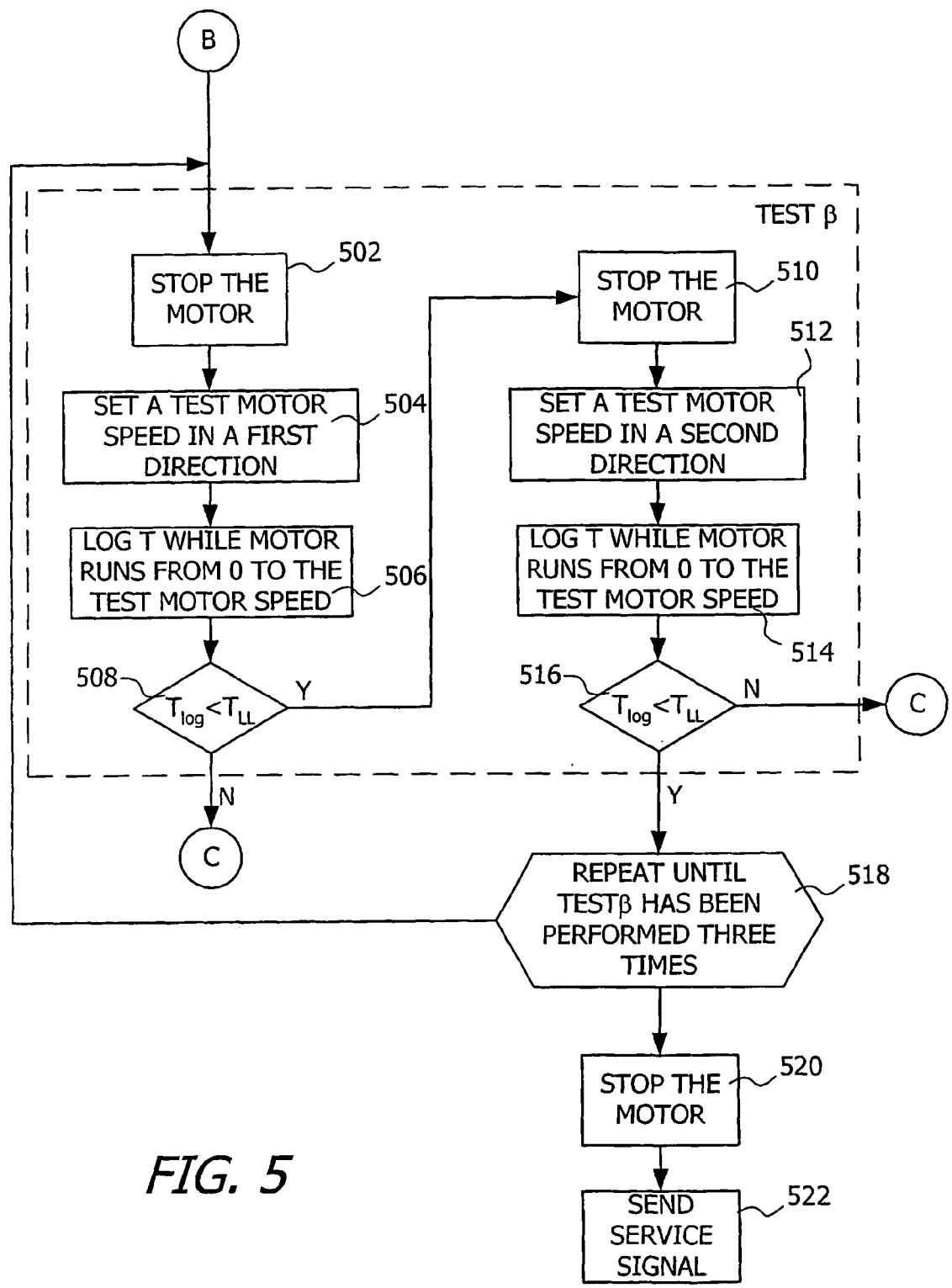
FIG. 5 shows a flowchart of attest sequence for testing a low torque indication, which test sequence is accessed from the main process of FIG. 3.

In FIGS. 3–5 a preferred process of the invention is described. When the system according to a preferred embodiment is started, step 302, the speed of the motor climbs to a given speed, which is the normal speed of operation or a speed that is determined by the desired value that is set in the system. When the speed has reached the given speed the torque (T) required at this speed is logged, step 304. The log is preferably performed during a short period of time, e.g. 1–10 seconds in the case of the load being a heat exchanger rotor.

Then the average torque $T_{AVREF}$ required during the normal operation is calculated. Additionally, a value for high level torque $T_{HL}$ and low level torque $T_{LL}$, respectively, are calculated, step 306. These calculations are based on $T_{AVREF}$.

$T_{HL}$ represents a high level of the torque that is greater than the torque of normal operation. The cause of such increase in torque demand could, for example, be a broken bearing, an object interfering with the load, etc.

$T_{LL}$ represents a low level of the torque that is below the torque of normal operation. The cause of such decrease in torque demand could, for example, be a slipping transmission part, a broken transmission part, etc.

When all initial data are acquired the present torque T required is measured at predetermined intervals, step 308, during the normal operation of the electric motor. Also, an average torque $T_{AV}$ is calculated, step 308. The $T_{AV}$ calculation is based on the mean value of the present and previously sampled values of T. Previously sampled values are preferably values sampled between the present value and a value sampled 1–10 seconds before the present sample. However, this time period can be greater or less depending on the present application.

In connection with each measurement of T and calculation of $T_{AV}$ the present torque T is compared to $T_{HL}$, step 310. If T is greater than $T_{HL}$ then the load requires too great torque and the process continues at position A in FIG. 4. If the present torque T does not exceed $T_{HL}$ then the process continues to step 312.

In step 312 the calculated average torque $T_{AV}$ is compared to $T_{LL}$. If $T_{AV}$ is below $T_{LL}$ then it is possible that the transmission part is broken or slipping or that something is wrong with the load and the process continues to position B in FIG. 5. If $T_{AV}$ exceeds $T_{LL}$, then the operation of the load is normal and the process returns to step 308 in order to make the next measurement.

The C reference represents a process step making the process return to normal operation from test sequences.

FIG. 4 shows the test sequence where the process continues when the torque exceeds $T_{HL}$. When the process is passed to A, the motor is stopped, step 402. Then the process continues into the sequence referred to as TEST α. In sequence TEST α the motor is restarted, step 404, and the torque T is measured, step 406. Then the torque T is compared to $T_{HL}$, step 408. If the torque T does not exceed $T_{HL}$ within a predetermined time, then the test sequence is terminated and the process returns to step 308, shown in FIG. 3, via C. However, if the torque exceeds $T_{HL}$, then the motor is stopped again, step 410. The sequence referred to as TEST α is then repeated again, as mentioned in step 412.

The sequence TEST α will be processed three times, according to step 412, as long as the torque T does not present a value below $T_{HL}$. In the case where the torque T does exceed $T_{HL}$ in all of the three test runs, the process sends a service signal and is halted for further investigation, step 414.

In FIG. 5 the process is continued at B if the average torque $T_{AV}$ is less than $T_{LL}$ in step 312, in FIG. 3. When directed to B the process enters the sequence TEST β and the motor is stopped, step 502. Then a test motor speed is set in a first direction, step 504, and the motor starts running towards the test motor speed. Said first direction is preferably the running direction of the motor during normal operation. In one preferred embodiment the test motor speed corresponds to the motor speed of normal operation.

During the acceleration of the motor the torque required is logged, step 508. The logging of T is preferably performed during a period of time starting after the start of the acceleration of the motor and ending at the latest when the motor has reached the test motor speed, in a preferred embodiment this period of time is about 1 second.

When the torque T has been logged a mean value $T_{log}$ of the logged torque T is tested against $T_{LL}$, step 508. If $T_{log}$ does not fall below $T_{LL}$, then the cause of the indicated decrease in torque found in step 312 in FIG. 3 only indicated temporarily fault and the process is returned to step 308, in FIG. 3, via C.

However, if $T_{log}$ is less than $T_{LL}$ the fault is still present and the motor is stopped once again, step 510, and then a test motor speed is set in a second direction, step 512, and the motor starts running towards the test motor speed. Said second direction is preferably the opposite direction of the first direction. In one preferred embodiment the test motor speed corresponds to the motor speed of normal operation. During the acceleration of the motor the torque T is logged, step 514.

When, the torque T has been logged a mean value $T_{log}$ of the logged torque is tested against $T_{LL}$, step 516. If $T_{log}$ does not fall below, then the process is returned to step 308, in FIG. 3.

However, if $T_{log}$ is less than $T_{LL}$ then the control of the process is passed to step 518. In step 518 the process checks if the sequence TEST β has been repeated three times. If the sequence TEST β has not been repeated three times, the process returns to step 502. However if the sequence TEST β has been repeated three times, the motor is stopped, step 520, a service signal is sent, step 522, and the process is halted for further investigation. Thus the sequence TEST β is repeated three times if not step 508 or step 516 finds that the torque T is at an acceptable level.

The sequence TEST β is considered to comprise two test sequences. One starting at the stop of the motor, step 502, and ending the decision T>$T_{LL}$, step 508, and the other one starting at the stop of the motor, step 510, and ending the decision T>$T_{LL}$, step 516.

Figure 6:
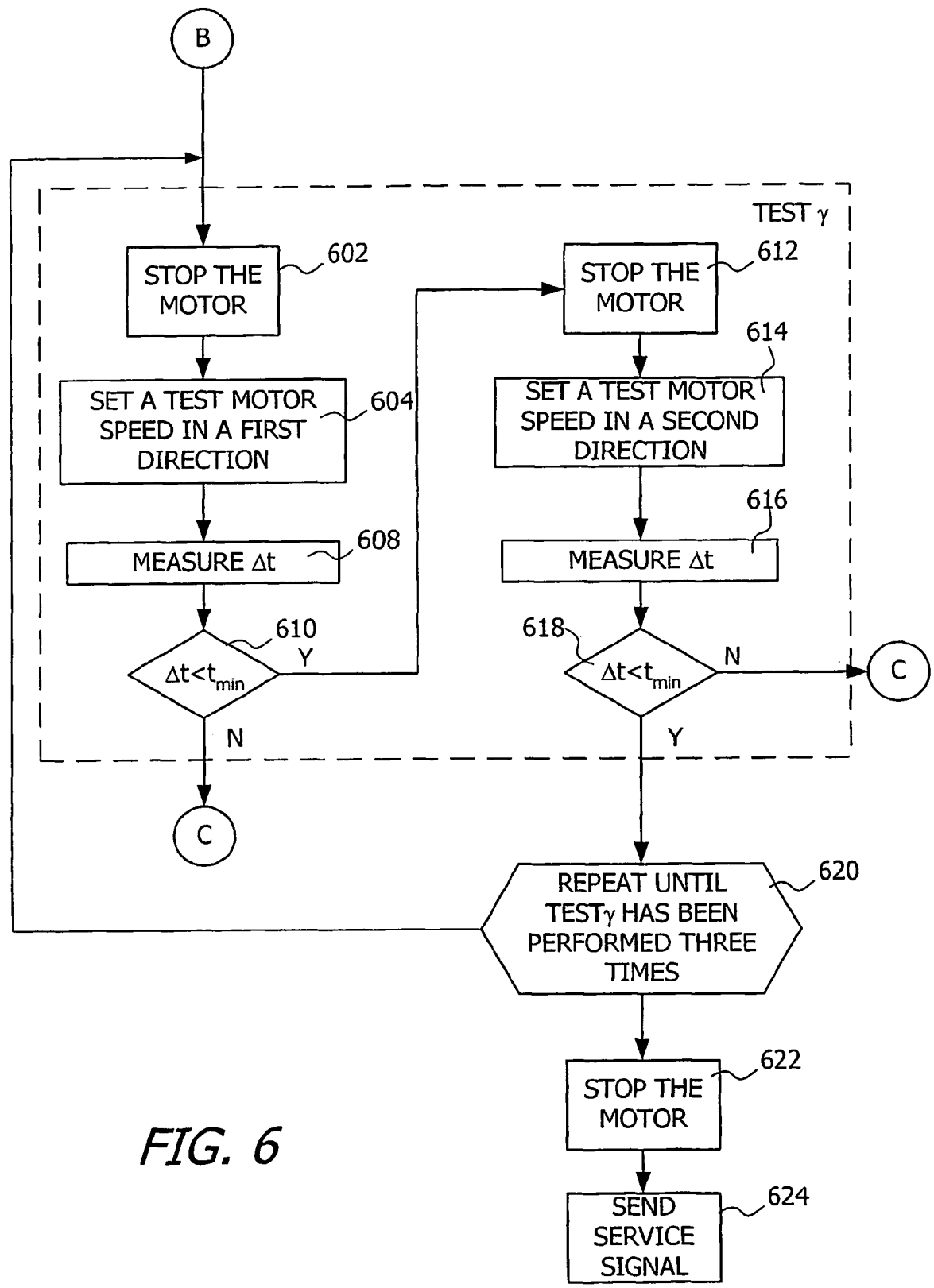
FIG. 6 shows a flowchart of an alternative test sequence for testing a low torque indication.

In FIG. 6 another preferred embodiment of the continued process, continued via B, is shown. The basic difference between the process described in FIG. 5 and the one in FIG. 6 is that the process of FIG. 6 measures the time required to accelerate the load instead of the torque required.

The process enters sequence TEST γ and the motor is stopped, step 602. Then the motor is set to run towards a test motor speed in a first direction, step 604. Preferably the first direction corresponds to the direction of rotation during normal operation of the system. In one preferred embodiment the test motor speed corresponds to the motor speed of normal operation. The time it takes for the motor to accelerate from 0 to the test speed is measured, step 608, and this time is represented by Δt. When the motor has reached the test motor speed, Δt is compared to $t_{min}$, step 610, which is a predetermined value of the minimum time required for the motor in a normally functioning system to reach the test speed. If $t_{min}$ is not is less than the process returns to step 308, in FIG. 3.

However, if $t_{min}$ is less than, the load is accelerated too easily, in other words the angular momentum required is lower than expected, and again the process is stopped, step 612. Then the motor is set to run towards a test motor speed in a second direction, step 614. The second direction is preferably the reverse direction in relation to the first direction. The time it takes for the motor to accelerate from 0 to the test speed is measured, step 616, and this time is represented by Δt. When the motor has reached the test motor speed, Δt is compared to $t_{min}$, step 618. If $t_{min}$ is not is less than the process returns to step 308, in FIG. 3.

However, if $t_{min}$ is less than the system is still not functioning properly and the process continues to step 620. In step 620 the process checks if the sequence TEST γ has been processed three times. If the sequence TEST γ has not been processed three times the process is returned to step 602 and the sequence is processed once again. However, if the sequence TEST γ has been processed three times the fault indicated is probably not temporary and the motor is stopped, step 622. Then a service signal is sent, step 624, and the process is halted for further investigation.

The sequence TEST γ is considered to comprise two test sequences. One starting at the stop of the motor, step 602, and ending at the decision Δt>$t_{min}$, step 610, and the other one starting at the stop of the motor, step 612, and ending the decision Δt>$t_{min}$, step 618.

Figure 7:
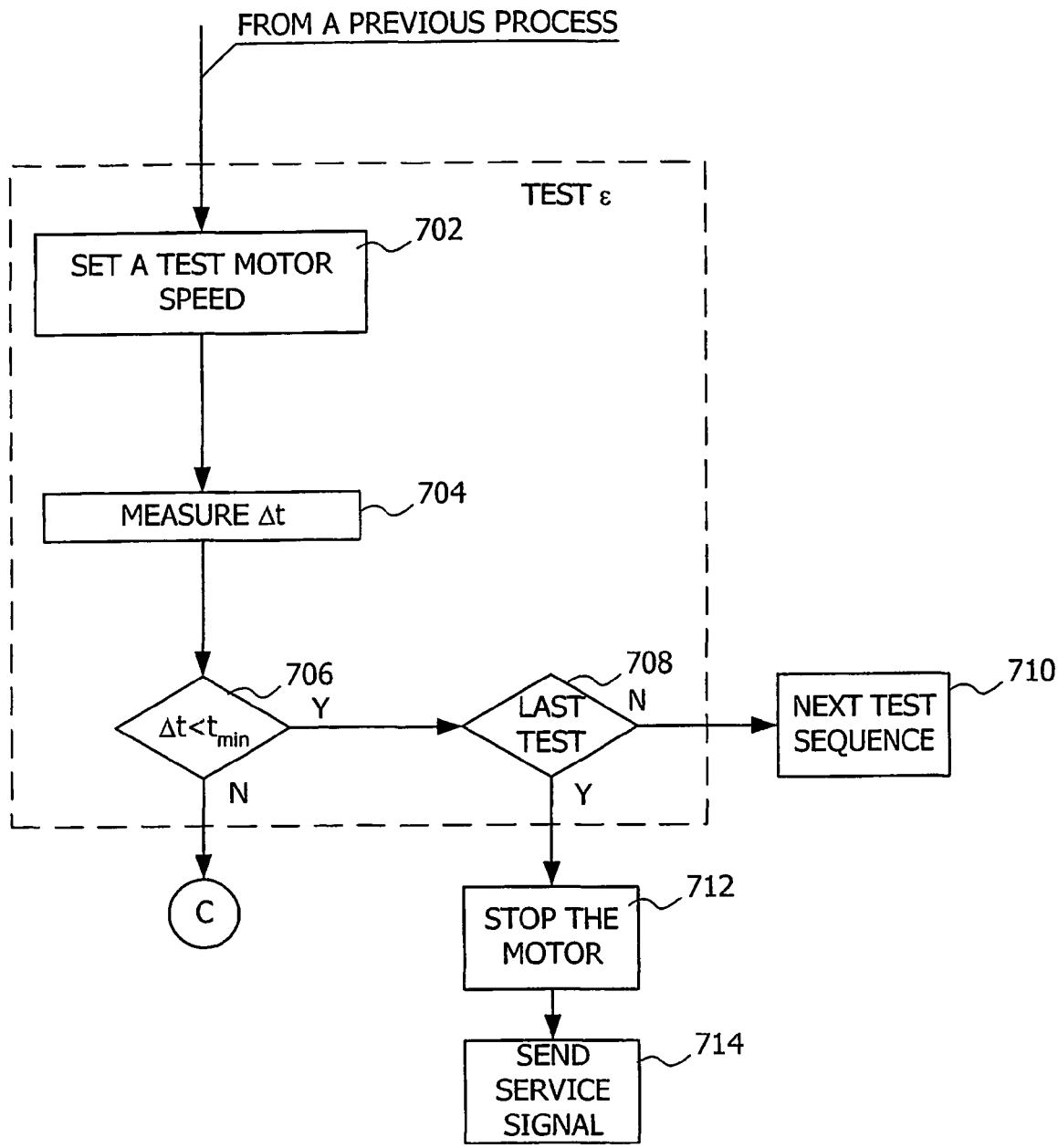
FIG. 7 shows a flowchart of a supplementary or alternative test sequence for testing a low torque indication.

According to another embodiment of the invention the process in FIG. 7 is incorporated in one of the process flows previously described. The sequence TEST ε could be positioned as the first test sequence processed when step 312 in FIG. 3 determines to direct the process to B. In such a case one of TEST β or TEST γ could be the "next test sequence" referred to in step 710. Another possibility is to implement the sequence TEST ε as the only test sequence. Yet another possible arrangement is to incorporate the sequence TEST ε in one of the processes described in FIGS. 5 or 6. A large number of other combinations are obvious to a person skilled in the art.

When the process is directed to the sequence TEST ε, directly from step 312 in FIG. 3 or incorporated in the sequences described in FIG. 5 or FIG. 6, the motor speed is set at a test value, step 702, and the test value is preferably lower than the present speed. Then the time Δt it takes for the motor to reach the test motor speed is measured, step 704, and the time Δt is compared to $t_{min}$, step 706. If Δt is not less than $t_{min}$, then the process returns to step 308 in FIG. 3. However, if Δt is less than $t_{min}$ and TEST ε is not the last test then the process continues at the next test sequence, step 708 and step 710. Further, if Δt is less than $t_{min}$ and TEST ε is the last test, the motor is stopped, step 712, and a service signal is sent, step 714.

According to another aspect of the invention one of or a combination of the tests described in FIGS. 5, 6, and 7 can be initiated at predetermined intervals, even if no low torque has been detected. According to this aspect of the invention there is no need for monitoring the torque during normal operation. For example, a test sequence could be initiated once an hour for testing the system. This aspect of the invention is primarily applicable to systems that can tolerate a break in normal operation as introduced by the test sequences. For systems not tolerating such a break the monitoring of the torque during normal operation results in the fact that a test sequence break is only initiated if there is reason to believe something is wrong with the transmission system.

The invention claimed is:

1. A method for monitoring and testing, during operation, the serviceability of a transmission part (4) arranged for transmission of torque between an electric motor (2) and a load (6), said method comprising the steps of:
   A) monitoring (308), during normal operation, the torque of the electric motor (2),
   B) initiating at least one test sequence if the monitored torque fall below a predetermined value (312), said test sequence comprising the steps of:
   setting a rotation speed of the electric motor (2) at a test rotation speed that differs from the rotation speed of the electric motor (2) immediately prior to said setting (504, 512), and
   at least logging the torque of the electrical motor (2) within a period starting from the setting of the rotation speed of the electric motor (2) and ending when the rotation speed of the electric motor (2) has reached the test rotation speed (506, 514), and C) sending a signal indicating an error (522) if no further test sequences are to be performed and if said at least one test sequence indicates that said logged torque is below a predetermined value. least one test sequence indicates that said registered time is less than a predetermined value.

2. The method according to claim 1, further comprising the step of decreasing the rotation speed of the motor to a low rotation speed (502, 510; 602, 612) prior to the step of setting the rotation speed at the test rotation speed (504, 512; 604, 614), wherein the test rotation speed is higher than the low rotation speed.

3. The method according to claim 2, wherein the low rotation speed is zero, i.e. the motor (2) is stopped.

4. The method according to claim 1, further comprising the step of halting the rotation speed of the electric motor to a stop (510; 612) prior to the step of setting the rotation speed of the electric motor at the test rotation speed(512; 614), wherein the test rotation speed is a rotation speed that makes the electric motor (2) rotate in the reverse direction in respect of normal operation.

5. The method according to claim 1, wherein the test rotation speed of the step of setting the rotation speed is lower than the rotation speed immediately prior to said setting.

6. The method according to claim 1, further comprising the step of stopping (520; 622) the motor (2) if the step of performing at least one measurement indicates that the serviceability of the transmission part (4) is not acceptable and if no further test steps are to be performed.

7. The method according to claim 1, further comprising at least one further test sequence to be performed if the previous test sequence indicated (516; 618) that the serviceability of the transmission part (4) is not acceptable and if the previous test sequence is not the last test sequence (518; 620).

8. A control device (8) for electric motors (2) comprising means (82, 92) for sensing the torque of an electric motor (2) during operation, said control device (8) being characterised in that it comprises:
A) means (82, 92) for monitoring whether the torque of the electric motor (2) fall below a predetermined value,
B) means (82, 88, 92) for performing at least one test sequence, said means (82, 88, 92) being arranged to perform said at least one test sequence if said means (82, 92) for monitoring indicates that the torque of the electric motor (2) fall below said predetermined value, wherein said means (82, 88, 92) for performing at least one test sequence comprises:
means (88) for setting a rotation speed of the electric motor (2) at a test rotation speed, which differs from the rotation speed of the electric motor (2) immediately prior to said setting, and
means (82, 92) for logging the torque of the electric motor (2) within a time period starting from the setting of the rotation speed of the electric motor (2) to the test rotation speed and ending when the rotation speed of the electric motor (2) has reached the test rotation speed, and
C) means (90, 92) for sending a signal indicating an error if no further test sequences are to be performed and if said at least one test sequence indicates that the logged torque is below a predetermined value.

9. The control device (8) according to claim 8, wherein the means (88, 92) for setting the rotation speed is arranged to set the test rotation speed at a speed that is higher than the speed immediately prior to said setting.

10. The control device (8) according to claim 8, wherein the means (88, 92) for setting the rotation speed is arranged to set the test rotation speed at a speed in a reverse direction in respect of the direction of the motor (2) during normal operation.

11. The control device (8) according to claim 8, wherein the means (88, 92) for setting the rotation speed is arranged to set the test rotation speed at a speed that is lower than the speed immediately prior to said setting.

12. The control device (8) according to claim 8, wherein the means (82, 92) for logging the torque of the electric motor (2) includes a current meter (82) for measuring the torque.

* * * * *

UNITED STATES PATENT AND TRADEMARK OFFICE
CERTIFICATE OF CORRECTION

PATENT NO. : 7,083,544 B2
APPLICATION NO. : 10/471375
DATED : August 1, 2006
INVENTOR(S) : Göransson et al.

It is certified that error appears in the above-identified patent and that said Letters Patent is hereby corrected as shown below:

Column 4, line 27, delete "attest" and insert --a test--.

Column 9, lines 4-6, delete the text appearing after "value."

Column 5, line 30, "88" should read --93--.

Column 7, line 49, "If $t_{min}$ is not is less than" should read --if $\Delta t$ is not less than $t_{min}$, --.

Column 7, line 51, "if $t_{min}$ is less than," should read --if $\Delta t$ is less than $t_{min}$, --.

Column 7, lines 60-61, "If $t_{min}$ is not is less than" should read -- If $\Delta t$ is not less than $t_{min}$ --.

Column 7, line 62, "if $t_{min}$ is less than" should read --if $\Delta t$ is less than $t_{min}$--.

Signed and Sealed this

Sixth Day of November, 2007

JON W. DUDAS
*Director of the United States Patent and Trademark Office*